(12) United States Patent
De Mondt et al.

(10) Patent No.: US 10,759,952 B2
(45) Date of Patent: Sep. 1, 2020

(54) AQUEOUS RADIATION CURABLE INKJET INKS

(71) Applicant: AGFA NV, Mortsel (BE)

(72) Inventors: Roel De Mondt, Mortsel (BE); Johan Loccufier, Mortsel (BE)

(73) Assignee: AGFA NV, Mortsel (BE)

( * ) Notice: Subject to any disclaimer, the term of this patent is extended or adjusted under 35 U.S.C. 154(b) by 85 days.

(21) Appl. No.: 15/318,432

(22) PCT Filed: Jun. 18, 2015

(86) PCT No.: PCT/EP2015/063754
§ 371 (c)(1),
(2) Date: Dec. 13, 2016

(87) PCT Pub. No.: WO2015/197472
PCT Pub. Date: Dec. 30, 2015

(65) Prior Publication Data
US 2017/0114235 A1    Apr. 27, 2017

(30) Foreign Application Priority Data
Jun. 26, 2014  (EP) .................................... 14174413

(51) Int. Cl.
*B41J 2/01* (2006.01)
*C09D 11/101* (2014.01)
*C09D 11/322* (2014.01)

(52) U.S. Cl.
CPC .............. *C09D 11/101* (2013.01); *B41J 2/01* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 2002/0149656 A1* | 10/2002 | Nohr | B41M 5/5218 347/95 |
| 2004/0029989 A1* | 2/2004 | Veya | C09D 11/101 522/49 |
| 2007/0281136 A1* | 12/2007 | Hampden-Smith | B41M 1/22 428/195.1 |
| 2008/0269410 A1 | 10/2008 | Ganapathiappan | |
| 2011/0104453 A1 | 5/2011 | Shinjo et al. | |
| 2011/0269901 A1* | 11/2011 | Chun | C08G 18/0814 524/590 |
| 2011/0318551 A1* | 12/2011 | Nakagawa | B01J 13/02 428/206 |

(Continued)

FOREIGN PATENT DOCUMENTS

| | | |
|---|---|---|
| EP | 1036831 A1 | 9/2000 |
| EP | 1379596 A2 | 1/2004 |
| EP | 2166046 A1 | 3/2010 |

(Continued)

OTHER PUBLICATIONS

Official Communication issued in International Patent Application No. PCT/EP2015/063754, dated Oct. 27, 2015.

*Primary Examiner* — Erica S Lin
(74) *Attorney, Agent, or Firm* — Stinson LLP

(57) ABSTRACT

An aqueous radiation curable inkjet ink contains an aqueous medium and polymer nanoparticles charged with a polymerizable compound.

25 Claims, 1 Drawing Sheet

(56) References Cited

U.S. PATENT DOCUMENTS

2012/0089180 A1* 4/2012 Fathi .................... B41J 2/17559
            606/214
2012/0321900 A1* 12/2012 Schwalm ............. C08G 18/672
            428/425.1

FOREIGN PATENT DOCUMENTS

| WO | 02/064689 A2 | 8/2002 |
| WO | 02/081577 A1 | 10/2002 |
| WO | 03/093378 A1 | 11/2003 |
| WO | 2013/034880 A2 | 3/2013 |

* cited by examiner

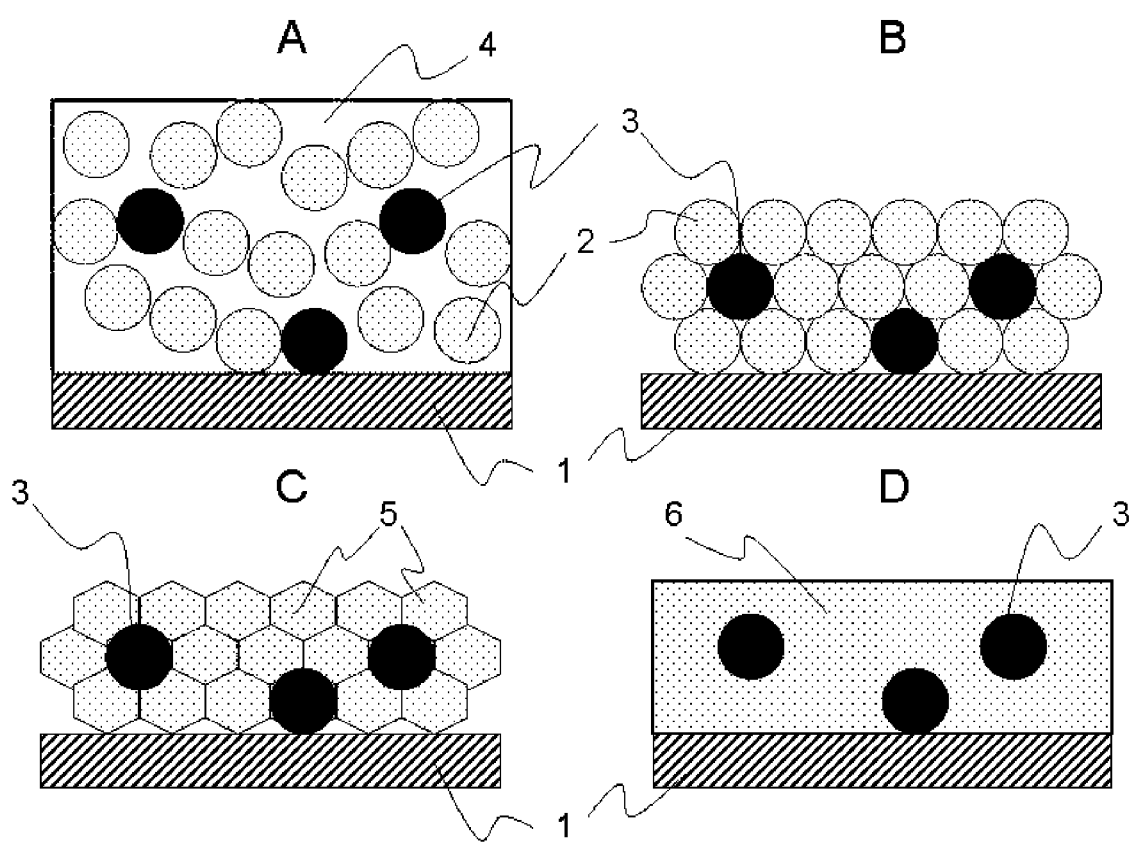

AQUEOUS RADIATION CURABLE INKJET INKS

CROSS REFERENCE TO RELATED APPLICATIONS

This application is a 371 National Stage Application of PCT/EP2015/063754, filed Jun. 18, 2015. This application claims the benefit of European Application No. 14174413.6, filed Jun. 26, 2014, which is incorporated by reference herein in its entirety.

BACKGROUND OF THE INVENTION

1. Field of the Invention

This invention relates to aqueous radiation curable inkjet inks and to their use in ink jet printing.

2. Description of the Related Art

A latex is a stable colloidal dispersion of natural or synthetic polymer particles in an aqueous medium. Synthetic latexes have been made by polymerizing monomers, generally (meth)acrylates, that have been emulsified with surfactants. Such latexes have been incorporated in aqueous inkjet inks. For example, US 2008269410 A (HP) discloses self-dispersing acrylate latex particulates for ink-jet inks.

After jetting a latex inkjet ink, a latex film is formed as shown by FIG. 1. Acrylate based polymeric particles tend to have a relatively high minimum film formation temperature (MFT), which prevents to use thermosensitive substrates in latex inkjet printing. The MFT tends to be very close to the glass transition temperature $T_g$ of the latex Thermosensitive substrates would be possible to use if the latex has a low $T_g$, e.g. below 0° C., however it was observed that such latexes cause jetting problems resulting in massive failing nozzles.

UV curable inkjet inks lacking water or organic solvents have been used extensively in industrial applications, because of their reliability and because that they adhere to a multitude of substrates. One disadvantage of these so-called '100% solids' UV curable inkjet inks is that relatively thick layers are obtained compared to aqueous inkjet inks which generally contain less than 20% of solids. Thin layers usually have much better flexibility. However in most other properties aqueous latex inkjet inks tend to exhibit an inferior performance compared to UV curable inkjet inks.

Some efforts have been made to improve the performance of aqueous latex inkjet inks by including features of UV curable inkjet inks, such as the incorporation of water-soluble UV curable monomers, e.g. EP 2166046 A (FUJI) and US 2011104453 (CANON), the use of cross-linkable latexes as in EP 1379596 A (UCB), and the combination of both as in WO 2013/034880 A (SERICOL) which discloses a radiation-curable ink comprising: (a) a polyurethane having ethylenically unsaturated groups; (b) a water-soluble triacrylate; (c) a colorant; (d) a liquid medium comprising water and organic solvent; and (e) optionally a photoinitiator; and (f) optionally a surfactant; wherein the weight of component (d) is greater than the combined weight of components (a), (b), (c), (e) and (f). The latter does not show any results on jetting performance.

Therefore, there remains a need for aqueous inkjet inks containing polymeric particles capable of combining improved jetting performance with improved physical and chemical properties.

SUMMARY OF THE INVENTION

In order to overcome the problems described above, preferred embodiments of the present invention have been realised with aqueous radiation curable inkjet ink as defined below.

It was surprisingly found that an aqueous radiation curable inkjet ink containing an aqueous medium and polymer nanoparticles charged with a polymerizable compound allowed jetting inkjet inks containing a high concentrations of polymer nanoparticles, although these polyurethane particles had a film forming temperature <0° C.

Further objects of the invention will become apparent from the description hereinafter.

BRIEF DESCRIPTION OF THE DRAWINGS

FIG. 1 shows in four phases A to D the film formation of an inkjet ink containing polymeric nanoparticles. Phase A shows the inkjet ink after jetting on a substrate 1 where polymeric nanoparticles 2 and colour pigment particles 3 are still embedded in the aqueous medium 4 of the inkjet ink. After evaporation of the aqueous medium a solid Phase B is obtained containing the polymeric nanoparticles 2 in contact with each other and with colour pigment particles 3. Further heating to a temperature above the film formation temperature results to deformed polymeric nanoparticles 5 embedding the colour pigment particles 3 in Phase C. Finally in Phase D, by polymer diffusion a mechanically coherent polymeric film 6 is obtained containing the colour pigment particles 3.

DETAILED DESCRIPTION OF THE PREFERRED EMBODIMENTS

Definitions

The term "polymer nanoparticles" means that at least part of the polymer particles has a particle diameter less than 1 µm as determined by Laser Diffraction. The polymer nanoparticles preferably have an average diameter smaller than 1 µm.

Unless otherwise specified, the term "water insoluble" means having a solubility at 25° C. of no more than 1 g/L in water.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e.

carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —$NO_2$.

The term "image" includes text, numbers, graphics, logos, photos, barcodes, QR codes, and the like. An image can be defined in 1 or more colours.

Aqueous Radiation Curable Inkjet Inks

An aqueous radiation curable inkjet ink according to a preferred embodiment of the present invention includes an aqueous medium and polymer nanoparticles charged with a polymerizable compound. The polymerizable compound is preferably selected from the group consisting of a monomer, an oligomer, a polymerizable photoinitiator, and a polymerizable co-initiator.

It is believed that the polymerizable compound provides the polymer particles with a "skin". This skin protects the polymer particles from agglomerating and fusing together. This is especially advantageous for polymer particles having a low film forming temperature, for example, polyurethane particles having a film forming temperature <0° C. In the absence of such a skin, reliable aqueous radiation curable inkjet inks with these polyurethane particles can only be made with small amounts of polymer particles, i.e. 5 wt % or less based on the total weight of the inkjet ink. In a preferred embodiment, the aqueous radiation curable inkjet ink contains at least 7 wt % of polymer particles, more preferably 9 to 13 wt % of polymer particles based on the total weight of the inkjet ink.

The polymerizable compound preferably has a water solubility of less than 1 g/L or even less than 0.1 g/L. If the solubility is higher then the polymerizable compound desorbs from the surface of the polymer particles, leading to problems of jettability especially at higher concentrations of 7 wt % or more based on the total weight of the inkjet ink.

The aqueous radiation curable inkjet ink is preferably a free radical radiation curable inkjet ink.

The polymerizable compound preferably includes at least one ethylenically unsaturated group selected from the group consisting of an acrylate group, a methacrylate group, a vinylether group, a styrene group, an acrylamide group, a methacrylamide group, an allyl ester group, an allyl ether group, a vinyl ester group, a fumarate group, a maleate group, a maleimide group and a vinyl nitrile group. In a more preferred embodiment, the polymerizable compound includes at least one acrylate group, because such a group provides high reactivity.

The polymer nanoparticles do not need to contain a polymerizable group. However, for increasing reactivity and improving physical properties, the polymer nanoparticles preferably include at least one ethylenically unsaturated group selected from the group consisting of an acrylate group, a methacrylate group, a vinylether group, a styrene group, an acrylamide group, a methacrylamide group, an allyl ester group, an allyl ether group, a vinyl ester group, a fumarate group, a maleate group, a maleimide group and a vinyl nitrile group. In a more preferred embodiment, the polymer nanoparticles include at least one acrylate group, because such a group provides high reactivity.

The aqueous radiation curable inkjet ink may be a colourless inkjet ink and be used, for example, as a primer to improve adhesion or as a varnish to obtain the desired gloss. However, preferably the aqueous radiation curable inkjet ink includes at least one colorant, more preferably a colour pigment and most preferably a self-dispersible colour pigment.

In addition to the polymerizable compounds charged on the polymer nanoparticles, the aqueous medium may also contain water-soluble polymerizable compounds. Such compounds can help to improve physical properties, as illustrated by the water-soluble triacrylate included in the inks WO 2013/034880 A (SERICOL)). However in a preferred embodiment, the aqueous radiation curable inkjet ink contains an aqueous medium which is substantially free of polymerizable compounds. The presence of water-soluble polymerizable compounds usually plays no role when printing on substantially non-absorbing substrates. However on porous or absorbing substrates, the water-soluble polymerizable compounds may penetrate into the substrate where they become difficult or no longer curable, such that they can have detrimental effects e.g. on the physical properties of the substrate. In the case of inkjet printing on food packaging, these polymerizable compounds may even migrate through the packaging material and cause health risks in the foodstuff.

In a preferred embodiment, the aqueous radiation curable inkjet ink is part of a radiation curable inkjet ink set, more preferably part of a radiation curable inkjet ink set including a plurality of inkjet inks. The radiation curable inkjet ink set preferably includes at least a cyan radiation curable inkjet ink, a magenta radiation curable inkjet ink, a yellow radiation curable inkjet ink and a black radiation curable inkjet ink.

The radiation curable CMYK-inkjet ink set may also be extended with extra inks such as red, green, blue, and/or orange to further enlarge the colour gamut of the Ink set. The radiation curable inkjet ink set may also be extended by the combination of the full density inkjet inks with light density inkjet inks. The combination of dark and light colour inks and/or black and grey inks improves the image quality by a lowered graininess.

The radiation curable ink set may also include one or more spot colours, preferably one or more corporate colours, such as e.g. the red colour of Coca-Col$^a$ and the blue colour of VISA™ or KLM™.

The curable inkjet ink set may also include a varnish. The curable inkjet ink set preferably also includes a white inkjet ink.

For having a good ejecting ability and fast inkjet printing, the viscosity of the aqueous inkjet ink at a temperature of 25° C. is preferably smaller than 30 mPa·s, more preferably smaller than 15 mPa·s, and most preferably between 1 and 12 mPa·s all at a shear rate of 1,000 $s^{-1}$. A preferred jetting temperature is between 10 and 70° C., more preferably between 20 and 40° C., and most preferably between 25 and 35° C.

The aqueous inkjet inks preferably have a surface tension between 18.0 and 45.0 mN/m at 25° C. An aqueous inkjet ink with a surface tension smaller than 18.0 mN/m at 25° C. usually includes a high amount of surfactant, which may cause problems of foaming. A surface tension greater than 45.0 mN/m at 25° C. often leads to insufficient spreading of the ink on a substrate.

Polymer Nanoparticles

The aqueous radiation curable inkjet ink includes polymer nanoparticles. There is no real limitation on the chemical nature of the polymer nanoparticles. Suitable examples of the polymer of the polymer nanoparticles include a vinyl polymer and a condensed polymer (e.g., an epoxy resin, polyester, polyurethane, polyamide, cellulose, polyether, polyurea, polyimide, and polycarbonate). Among the above, a vinyl polymer is preferable because of easily controlled synthesis. However for good physical properties, such as adhesion and solvent resistance, of the printed image, a polyurethane polymer or copolymer is particularly preferred.

The polymer nanoparticles are preferably self-dispersible polymer nanoparticles. In preparing a self-dispersing polymer latex, preferably a monomer is used selected from the group consisting of a carboxylic acid monomer, a sulfonic acid monomer, and a phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate. Such monomers may be incorporated into polyurethane copolymers which include a (meth)acrylate polymeric chain.

For polyurethane polymer particles, the self-dispersing group may be incorporated via a diol and/or a diamine having any of phosphate group, sulfonic acid group, N,N-disubstituted amino group, carboxyl group, neutralized phosphate group, neutralized sulfonic acid group, neutralized N,N-disubstituted amino group and neutralized carboxyl group. Specific examples thereof include trimethylolpropane monophosphate, trimethylolpropane monosulfate, a polyester diol where at least a part of dibasic acid component is sodium sulfosuccinate or sodium sulfoisophthalate, N-methyldiethanolamine, diaminocarboxylic acid such as lysine, cystine or 3,5-diaminocarboxylic acid, 2,6-dihydroxybenzoic acid, 3,5-dihydroxybenzoic acid, dihydroxyalkylalkanoic acid such as 2,2-bis(hydroxymethyl)propionic acid, 2,2-bis(hydroxyethyl)propionic acid, 2,2-bis(hydroxypropyl)-propionic acid, bis(hydroxymethyl)acetic acid or 2,2-bis(hydroxymethyl)butanoic acid, bis(4-hydroxyphenyl)-acetic acid, 2,2-bis(4-hydroxyphenyl)pentanoic acid, tartaric acid, N,N-hydroxyethylglycine, N,N-bis(2-hydroxyethyl)-3-carboxypropionamide and a carboxyl group-containing polycaprolactone diol where a lactone compound such as ε-caprolactone is added to dihydroxyalkylalkanoic acid.

Manufacturing methods for polyurethane polymer or copolymer nanoparticles are well-known. Generally a compound having a salt group, a polyisocyanate compound having two or more isocyanate groups, and a polyol compound are reacted to form a polyurethane polymer. If a copolymer is desired then the reaction is performed in such a manner so as to make the isocyanate group excessive in concentration, whereupon a polyurethane prepolymer having terminal isocyanate group is prepared. After that, the polyurethane polymer having terminal isocyanate group is made to react with a compound being curable with active energy ray having one or two hydroxyl group(s) and one or more ethylenic unsaturated double bond(s) whereupon a polyurethane having ethylenic unsaturated polymerizable groups being curable with active energy ray and a salt group is prepared. Then the salt group is neutralized at 50° C. or lower using a basic compound.

Examples of the above di- and higher functional polyisocyanate compound include an aliphatic diisocyanate such as 1,6-hexamethylene diisocyanate, 2,2,4-trimethyl-hexamethylene diisocyanate or lysine diisocyanate; an aliphatic polyisocyanate such as a trimer of the above aliphatic diisocyanate or an adduct of low-molecular triol with the above aliphatic isocyanate; an alicyclic diisocyanate such as isophorone diisocyanate, hydrogenated MDI, hydrogenated tolylene diisocyanate, methylcyclohexylene diisocyanate, isopropylidenecyclohexyl-4,4'-diisocyanate or norbornene diisocyanate; an alicyclic polyisocyanate such as a trimer of the above alicyclic diisocyanate or an adduct of low-molecular triol with the above alicyclic isocyanate; an aromato-aliphatic diisocyanate such as xylylene diisocyanate; an aromatic alicyclic polyisocyanate such as a trimer of xylylene diisocyanate or an adduct of low-molecular triol with the above aromato-aliphatic isocyanate; an aromatic diisocyanate such as 4,4'-diphenylmethane diisocyanate or tolylene diisocyanate; an aromatic polyisocyanate such as triphenylmethane triisocyanate, a trimer of the above aromatic diisocyanate or an adduct of low-molecular triol with the above aromatic isocyanate; a tri- or higher functional polyisocyanate such as polymethylene polyphenyl isocyanate; and a polyisocyanate compound having a carbodiimide group such as Cosmonate LL (manufactured by Mitsui Chemical; a mixture of carbodiimidated 4,4'-diphenylmethane diisocyanate with 4,4'-diphenylmethane diisocyanate) or Carbodilide V-05 (manufactured by Nisshinbo; a terminal aliphatic polyisocyanate compound having a polycarbodiimide group). It is also possible that two or more of the above polyisocyanate compounds are mixed and used.

Examples of the above polyol compound include ethylene glycol, propylene glycol, diethylene glycol, cyclohexane-1,4-dimethanol, 1,3-butylene glycol, 1,4-butylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, cyclohexyl dimethanol, bisphenol A, bisphenol F, hydrogenated bisphenol A, hydrogenated bisphenol F, castor oil modified diol and castor oil modified polyol.

The polymer nanoparticles preferably contain at least one polymerizable group. The polymer nanoparticles preferably include at least one ethylenically unsaturated polymerizable group selected from the group consisting of an acrylate group, a methacrylate group, a vinylether group, a styrene group, an acrylamide group, a methacrylamide group, an allyl ester group, an allyl ether group, a vinyl ester group, a fumarate group, a maleate group, a maleimide group and a vinyl nitrile group.

The polymer nanoparticles are preferably based on a polyurethane having ethylenically unsaturated polymerizable groups, more preferably a polyurethane having one or more acrylate groups.

The polymer nanoparticles are preferably based on polymers or copolymers, more preferably polyurethane or copolymers thereof which contain at least one acrylate group and wherein the polymerizable compound contains at least one acrylate group.

Polyurethane nanoparticles having ethylenically unsaturated groups are commercially available as aqueous dispersions from a number of sources for use in wood and floor finishes. For example, Cytec sell such polyurethane dispersions under the Ucecoat trade mark. Examples of commercially available dispersions comprising a polyurethane having ethylenically unsaturated groups include Alberding™ Lux 399 and Lux 515 from Alberdingk Boley, Bayhydrol™ UV grades from BAYER, Laromer™ 8949 from BASF and Ucecoat™ 7571, 7655, 7689, 7699 and 7890 from Cytec, with Ucecoat™ 7655 and Bayhydrol™ UV XP 2689 being preferred.

The polymer particles may have a film forming temperature of below 0° C. The minimum film-forming temperature (MFT) is preferably −80 to 150° C., and more preferably no more than 50° C.

Colorants

The colorant in the aqueous radiation curable inkjet ink can be a dye, but is preferably a colour pigment. The pigmented aqueous inkjet ink most preferably contains a so-called self-dispersible colour pigment, however a colour pigment dispersed with a dispersant, preferably a polymeric dispersant, is also suitable. In the latter case the inkjet ink may also contain a dispersion synergist for further improving the dispersion quality and stability of the ink by interacting with the dispersant.

Suitable commercially available aqueous pigment dispersions include Pro-Jet™ APD 1000 yellow, magenta, cyan and black from FUJIFILM Imaging Colorants; D71 and D75 cyan, magenta, yellow and black dispersions from Diamond Dispersions A self-dispersible colour pigment requires no dispersant, because the pigment surface has ionic groups which realize electrostatic stabilization of the pigment dispersion. In case of self-dispersible colour pigments, the steric stabilization obtained by using a polymeric dispersant becomes optional. The preparation of self-dispersible colour pigments is well-known in the art and can be exemplified by EP 904327 A (CABOT).

The colour pigment may also be a coloured, water-insoluble core and a polymer (e.g. an acrylate polymer) shell having water-dispersing groups (e.g. carboxy and/or sulpho groups). Such colorants may be obtained, if desired, by dispersing a pigment in a liquid medium comprising a dispersant having carboxy groups and a crosslinking agent and cross-linking the dispersant with the crosslinking agent, thereby forming a polymer shell having water-dispersing groups around a pigment core. Suitable methods for making such colorants are described in more detail in, for example, WO 2006/064193 A (FUJI) and WO 2011/008810 (DU PONT).

The colour pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Some examples of pigments with coloristic properties useful in ink jet inks include: (cyan) C.I. Pigment Blue 15:3 and C.I. Pigment Blue 15:4; (magenta) C.I. Pigment Red 122 and C.I. Pigment Red 202; (yellow) C.I. Pigment Yellow 14, C.I. Pigment Yellow 74, C.I. Pigment Yellow 95, C.I. Pigment Yellow 110, C.I. Pigment Yellow 114, C.I. Pigment Yellow 128, C.I. Pigment Yellow 151 and C.I. Pigment Yellow 155; (red) C.I. Pigment Orange 5, C.I. Pigment Orange 34, C.I. Pigment Orange 43, C.I. Pigment Orange 62, C.I. Pigment Red 17, C.I. Pigment Red 49:2, C.I. Pigment Red 112, C.I. Pigment Red 149, C.I. Pigment Red 177, C.I. Pigment Red 178, C.I. Pigment Red 188, C.I. Pigment Red 254, C.I. Pigment Red 255 and C.I. Pigment Red 264; (green) C.I. Pigment Green 1, C.I. Pigment Green 2, C.I. Pigment Green 7 and C.I. Pigment Green 36; (blue) C.I. Pigment Blue 60, C.I. Pigment Violet 3, C.I. Pigment Violet 19, C.I. Pigment Violet 23, C.I. Pigment Violet 32, C.I. Pigment Violet 36 and C.I. Pigment Violet 38; and mixed crystals thereof.

A particularly preferred pigment for a cyan aqueous inkjet ink is a copper phthalocyanine pigment, more preferably C.I. Pigment Blue 15:3 or C.I. Pigment Blue 15:4.

Particularly preferred pigments for yellow aqueous inkjet ink are C.I Pigment Yellow 151 and C.I. Pigment Yellow 74, and mixed crystals thereof.

For a black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, a black inkjet ink including a carbon black pigment and at least one pigment selected from the group consisting of a blue pigment, a cyan pigment, magenta pigment and a red pigment. It was found that such a black inkjet ink allowed easier and better colour management due to its neutral black colour.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink should be between 0.005 μm and 15 μm. Preferably, the average pigment particle size is between 0.005 and 5 μm, more preferably between 0.005 and 1 μm, particularly preferably between 0.005 and 0.3 μm and most preferably between 0.040 and 0.150 μm.

The colour pigment is used in the pigmented inkjet ink in an amount of 0.1 to 20 wt %, preferably 1 to 10 wt %, and most preferably 2 to 5 wt % based on the total weight of the pigmented inkjet ink. A pigment concentration of at least 2 wt % is preferred to reduce the amount of inkjet ink needed to produce the colour pattern, while a pigment concentration higher than 5 wt % reduces the colour gamut for printing the colour pattern with print heads having a nozzle diameter of 20 to 50 μm.

A white inkjet ink preferably includes a pigment with a high refractive index, preferably a refractive index greater than 1.60, preferably greater than 2.00, more preferably greater than 2.50 and most preferably greater than 2.60. Such white pigments generally have a very covering power, i.e. a limited amount of white ink is necessary to hide the colour and defects of the core layer. The most preferred white pigment is titanium dioxide.

The white inkjet ink preferably contains the white pigment in an amount of 5 wt % to 30 wt %, more preferably 8 to 25 wt % of white pigment based upon the total weight of the white inkjet ink.

The numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

Dispersants

The pigmented inkjet ink may contain a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);
alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;
graft copolymers (graft copolymers consist of a polymeric backbone with polymeric side chains attached to the backbone); and
mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOL-SPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

In a particularly preferred embodiment, the polymeric dispersant used in the one or more pigmented inkjet inks is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

Polymerizable Compounds

The polymerizable compound preferably has a water solubility at 25° C. of less than 1 g/L or even less than 0.1 g/L so that it can be charged onto the polymer nanoparticles.

The polymerizable compound charged on the polymer particle is preferably selected from the group consisting of a monomer, an oligomer, a polymerizable photoinitiator, and a polymerizable co-initiator. The polymerizable compound may consist of a single compound or a mixture of 2, 3 or more polymerizable compounds. For example, a combination of 2 or 3 monomers or a combination of a monomer and a photoinitiator may be charged onto the polymer nanoparticles.

Any monomer and oligomer capable of free radical polymerization may be used in the aqueous radiation curable inkjet ink. The monomers and oligomers may have different degrees of polymerizable functionality, and a mixture including combinations of mono-, di-, tri- and higher polymerizable functionality monomers may be used.

The monomers and oligomers used, especially for food packaging applications, are preferably purified compounds having no or almost no impurities, more particularly no toxic or carcinogenic impurities. The impurities are usually derivative compounds obtained during synthesis of the polymerizable compound. Purification methods are well-known to those skilled in the art of manufacturing monomers and oligomers. Sometimes, however, some compounds may be added deliberately to pure polymerizable compounds in harmless amounts, for example, polymerization inhibitors or stabilizers.

Particularly preferred monomers and oligomers are those listed in [0106] to [0115] in EP 1911814 A (AGFA);

In a preferred embodiment, the polymerizable compound is selected from the group consisting of N-vinyl caprolactam, phenoxyethyl acrylate, dipropyleneglycoldiacrylate, (ethoxylated) trimethylolpropane triacrylate, pentaerythritol tetraacrylate, and cyclic trimethylolpropane formal acrylate.

In a preferred embodiment, the charged polymer nanoparticles are charged with 3 to 40 wt %, more preferably 5 to 30 wt % and most preferably 7.5 to 25 wt % of monomer relative to the total weight of the charged polymer nanoparticle.

In a particularly preferred embodiment of the aqueous radiation curable inkjet ink, the polymer particles are charged with one or more polymerizable photoinitiators. These inkjet inks can be advantageously used in applications where so-called low migration inkjet inks are useful for minimizing health risks, such as food packaging, drink packaging, pharmaceutical packaging, cutlery, drinking vessels, dinner plates, placemates, toys, medical devices, shoes, textile and clothing.

The polymerizable photoinitiator is preferably a free radical photoinitiator, more specifically a Norrish type I initiator or a Norrish type II initiator. A free radical photoinitiator is a chemical compound that initiates polymerization of monomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or a co-initiator. Both type I and type II photoinitiators can be charged to the polymer nanoparticles, alone or in combination. The aqueous radiation curable inkjet ink preferably includes no polymerizable cationic photoinitiator.

The polymerizable photoinitiators may include a photoinitiating group derived from photoinitiators are disclosed in CRIVELLO, J.V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiating groups may be derived from benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Preferred polymerizable photoinitiators contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

Preferred polymerizable photoinitiators contain one or more photoinitiating functional groups derived from a Norrish type II-initiator selected from the group consisting of benzophenones, thioxanthones, 1,2-diketones and anthraquinones.

Other non-polymerizable photoinitiators may be present in the aqueous medium as water soluble or water dispersible photoinitiators, and/or charged together with a polymerizable compound onto the polymer nanoparticles.

However most preferably, especially for low migration inkjet printing applications, the photoinitiators in the aqueous radiation curable inkjet ink consist of polymerizable photoinitiators.

Suitable polymerizable photoinitiators are also those disclosed in EP 2065362 A (AGFA) in paragraphs [0081] to [0083] for polymerizable photoinitiators. Other preferred polymerizable photoinitiators are those disclosed in EP 2161264 A (AGFA).

In a photoinitiating system, one of the photoinitiators can also function as a sensitizer enhancing the reactivity of another photoinitiator. Preferred sensitizers are polymerizable sensitizers such as those disclosed in EP 2053095 A (FUJIFILM).

In a preferred embodiment, the charged polymer nanoparticles are charged with 2 to 30 wt %, more preferably 5 to 20 wt % and most preferably 7 to 15 wt % of polymerizable photoinitiator(s) relative to the total weight of the charged polymer nanoparticles.

In a very preferred embodiment, the aqueous radiation curable inkjet ink includes a polymerizable thioxanthone photoinitiator and an acylphosphine oxide-based polymerization photoinitiator, more preferably a bis(2,4,6-trimethylbenzoyl)-phenylphosphineoxide photoinitiator.

Photoinitiators like bis(2,4,6-trimethylbenzoyl)-phenylphosphineoxide photoinitiator are monofunctional but are allowed to migrate in fairly high amount by the Swiss ordinance SR 817.023.21 on Objects and Materials due to their very low toxicity level.

In order to increase the photosensitivity further, the aqueous radiation curable inkjet ink, may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino) benzoate, 2-(dimethylamino)ethylbenzoate, ethyl-4-(dimethylamino) benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate). The preferred co-initiators are aminobenzoates.

The co-initiator is preferably a polymerizable co-initiator, more preferably a polymerizable co-initiator including at least one (meth)acrylate group, more preferably at least one acrylate group.

Some co-initiators, like ethylhexyl-4-dimethylaminobenzoate, are not diffusion hindered co-initiators but are allowed by the Swiss ordinance SR 817.023.21 on Objects and Materials due to their very low toxicity level. In a preferred embodiment, the aqueous radiation curable inkjet ink includes ethylhexyl-4-dimethylaminobenzoate as co-initiator.

The aqueous radiation curable inkjet ink preferably includes a polymerizable amine co-initiator.

Preferred polymerizable co-initiators disclosed in EP 2053101 A (AGFA) in paragraphs [0088] to [0097]. Preferred commercially available co-initiators include Photomer™ 4967F and Photomer™ 5006F from IGM; CN3715 LM from ARKEMA; Genomer™ 5275 from RAHN; and Ebecryl™ PM6 from ALLNEX.

In a preferred embodiment, the charged polymer nanoparticles are charged with 0.5 to 25 wt %, more preferably 2 to 15 wt % and most preferably 3 to 10 wt % of polymerizable co-initiator(s) relative to the total weight of the charged polymer nanoparticle.

Water-Soluble Monomers and Oligomers

The aqueous radiation curable inkjet ink may contain water soluble monomers and/or oligomers, preferably having a water-solubility of at least 10 wt % in demineralized water at 25° C. The water soluble monomers and/or oligomers include preferably at least one polymerizable group selected from the group consisting of an acrylate group, a methacrylate group, an acrylamide group and a methacrylamide group.

Suitable examples include N,N-dimethylaminoethyl methacrylate, N,N-dimethylaminoethyl acrylate, N,N-dimethylaminopropyl methacrylate, N,N-dimethylaminopropyl acrylate, N,N-dimethylamino acrylamide, N,N-dimethylamino methacrylamide, N,N-dimethylaminoethyl acrylamide, N,N-dimethylaminoethyl methacrylamide, N,N-dimethylaminopropyl acrylamide, N,N-dimethylaminopropyl methacrylamide, and quaternized compounds thereof; and a (meth)acrylic ester of a polyhydric alcohol, a (meth)acrylic ester of a glycidiyl ether of a polyhydric alcohol, a (meth) acrylic ester of polyethylene glycol, a (meth)acrylic ester of an ethylene oxide adduct of a polyhydric alcohol, and a UV-curable monomer or oligomer such as a reaction product between a polybasic acid anhydride and a hydroxyl-group-containing (meth)acrylic ester.

In a preferred embodiment, the aqueous radiation curable inkjet ink contains 1 to 30 wt %, more preferably less than 20 wt % and most preferably less than 10 wt % of water soluble monomers based on the total weight of the aqueous radiation curable inkjet ink.

In another preferred embodiment, the aqueous radiation curable inkjet ink contains no water soluble monomers. This is especially advantageous for printing applications like food packaging, where water soluble monomers tend to migrate with into the packaging.

Water-Soluble Photoinitiators and Co-Initiators

If the aqueous radiation curable inkjet ink is intended for low migration inkjet printing applications, such as food packaging, then preferably no water-soluble photoinitiator and/or co-initiator is present.

However for other printing applications, one or more water soluble photoinitiators may be present in the aqueous radiation curable inkjet ink as sole photoinititiator(s), or in addition to one or more photoinitiators charged onto polymer nanoparticles.

Suitable water soluble photoinitiators include lithium- and magnesium phenyl-2,4,6-trimethylbenzoylphosphinates and commercially available photoinitiators include Darocur™ 4265, Irgacure™ TPO-L, Irgacure™ 500, Irgacure™ 754, Irgacure™ 2959 and Irgacure™ 2100 from BASF; and Genocure™ MBF and Nuvapol™ PI 3000 from RAHN.

Water soluble photoinitiators have extensively been reviewed by Green W. A. and Timms A. W. in Radiation Curing in Polymer Science and Technology, 2, 375-434 (1993). Further water soluble photoinitiators have been disclosed by Liska R. et al. in Journal of Polymer Science: Part A: Polymer Chemistry, 40, 1504-1518 (2002) and references cited therein and Surface Coatings International, 83(6), 297-303 (2000)), by Jiang X. et al in Macromolacularr Chemistry and Physics, 209(15), 1593-1600 (2008) and in JP2007-125381 (Konica Minolta Holdings, Inc.).

The aqueous radiation curable inkjet ink preferably contains 0 to 30 wt %, more preferably less than 20 wt % and most preferably less than 10 wt % of water soluble photoinitiators based on the total weight of the aqueous radiation curable inkjet ink.

Suitable water soluble co-initiators include compounds such as triethanolamine, methyl diethanolamine.

Further preferred water soluble co-initiators are selected from the group consisting of N-phenyl glycine derivatives and 4-dialkylamino-benzoic acid derivatives or salts thereof, N-phenyl glycine and 4-dimethylamino-benzoic acid being particularly preferred.

The aqueous radiation curable inkjet ink preferably contains 0 to 30 wt %, more preferably less than 20 wt % and most preferably less than 10 wt % of water soluble co-initiators based on the total weight of the aqueous radiation curable inkjet ink.

Stabilizers

The aqueous radiation curable inkjet ink may contain one or more stabilizers. These stabilizers can be stabilizers that interfere with the polymerization process, usually called polymerization inhibitors, or other types of stabilizers, such as light stabilizers protecting decolouration from the colorants in the inkjet ink by UV light or ozone;

Suitable polymerization inhibitors include secondary aromatic amines, sterically hindered phenol type antioxidants, hindered amine stabilizers (HAS), phosphites and phosphonites type antioxidants, hydroxylamine compounds, acryloyl modified phenols and blends thereof. Suitable examples are listed in § 1.10.1 to 1.10.5 of ZWEIFEL HANS, et al. Plastics Additives Handbook. 6th edition. Munchen: Hanser Publications, 2008. p. 97-136.

Suitable polymerization inhibitors include hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt %, more preferably less than 1 wt % of the total weight of the aqueous radiation curable inkjet ink.

Suitable light stabilizers include UV absorbers, such as hydroxybenzophenones and hydroxyphenylbenzotriazoles; hydroperoxide decomposers, such as dialkyldithiocarbamates, dialkyldithio phosphates and thiobisphenolates; and hindered amine light stabilizers (HALS), such as bis(2,2,6, 6-tetramethyl-4-piperidyl) sebacate and 2,2,6,6-tetramethyl piperidines. Suitable examples are listed in § 1.10.6 and 1.10.7 of ZWEIFEL HANS, et al. Plastics Additives Handbook. 6th edition. Munchen: Hanser Publications, 2008. p. 97-136.

Excessive addition of these light stabilzers will also lower the ink sensitivity to curing. The amount of a light stabilizer is preferably lower than 5 wt %, more preferably less than 2 wt % of the total weight of the aqueous radiation curable inkjet ink Biocides The aqueous radiation curable inkjet ink preferably includes a biocide. Suitable biocides for the aqueous inkjet inks include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added in an amount of 0.001 to 3.0 wt. %, more preferably 0.01 to 1.0 wt. %, each based on the total weight of the pigmented inkjet ink.

Organic Solvents

The aqueous radiation curable inkjet ink preferably contains at least one organic solvent, preferably one or more water-miscible organic solvents. As will be understood, organic solvents are not radiation curable and may serve several purposes. For example, an organic solvent may help to solubilize one or more of the ink components.

An organic solvent may also be used as humectant. Such solvents are capable of delaying the loss of water which is important for latency time, i.e. the time that nozzles can be left uncovered and idle before there is a significant reduction in performance, for instance a reduction in drop velocity that will noticeably affect the image quality.

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are 2-pyrrolidone and glycerol, since the latter were found to be the most effective for improving inkjet printing reliability in an industrial environment.

Preferred organic solvents comprise water-miscible amides, e.g. optionally substituted cyclic and/or straight chain water-miscible amides and combination comprising two or more thereof.

Examples of suitable amides include pyrrolidones (e.g. 2-pyrrolidone), N-alkyl pyrollidones (e.g. N-ethyl pyrrolidone), N,N-dialkyl alkylamides (e.g. N,N-dimethyl ethylamide), alkoxylated N,N-alkyl alkylamides (e.g. 3-methoxy-N,N-dimethylpropanamide) and mixtures comprising two or more thereof.

Preferably the organic solvent is selected such that the composition does not require any toxicity labelling.

The organic solvent is preferably added to the inkjet ink in an amount of 0.1 to 40 wt %, more preferably 1 to 30 wt %, and most preferably 3 to 25 wt % based on the total weight of the inkjet ink.

The water and organic solvent are preferably present in the inkjet ink in a weight ratio of 1:1 to 19:1, more preferably 1:1 to 9:1 and especially 3:2 to 9:1.

pH Adjusters

The aqueous radiation curable inkjet ink may contain at least one pH adjuster. Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are triethanol amine, NaOH and H$_2$SO$_4$.

Surfactants

The aqueous radiation curable inkjet ink may contain at least one surfactant. The surfactant(s) can be anionic, cat-ionic, non-ionic, or zwitter-ionic and are usually added in a total quantity less than 5 wt % based on the total weight of the inkjet ink and particularly in a total less than 2 wt % based on the total weight of the inkjet ink.

The aqueous radiation curable inkjet ink preferably has a surface tension between 18.0 and 45.0 mN/m at 25° C., more preferably between a surface tension between 21.0 and 39.0 mN/m at 25° C.

Suitable surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and/or silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes. Preferred commercial silicone surfactants include BYK™ 333 and BYK™ UV3510 from BYK Chemie.

Particularly preferred commercial fluorosurfactant include Zonyl™ FSN and Capstone™ FS3100 from DU PONT.

Manufacturing of Inkjet Inks

A manufacturing method of an aqueous radiation curable inkjet ink according to a preferred embodiment of the present invention includes the steps of: a) charging a polymerizable compound on to polymer nanoparticles in an aqueous medium; and b) adding at least one component selected from the group consisting of a colorant, a surfactant, a pH adjuster and an organic solvent.

For charging a polymerizable compound onto polymer nanoparticles, the polymerizable compound, e.g. a monomer or a polymerizable photoinitiator, is first dissolved in a water-immiscible organic solvent having a boiling point of lower than 100° C. This solvent mixture is then finely dispersed in water or an aqueous medium, for example by a homogenizer, a microfluidizer or very high speed stirring in order to form an "oil-in-water" emulsion. This emulsion is then under stirring added to an aqueous medium containing dispersed polymer nanoparticles. The organic solvent is distilled there from so that the polymerizable compound is transferred from the organic solvent phase to the surface of the polymer nanoparticles as it becomes insoluble in the aqueous phase.

In order to obtain more concentrated charged polymer nanoparticle dispersions, the following method is used. The polymerizable compound, e.g. a monomer or a polymerizable photoinitiator, is first dissolved in a water-immiscible organic solvent having a boiling point of lower than 100° C. This solvent mixture is then added to an aqueous medium containing dispersed polymer nanoparticles under very high speed stirring or by using a homogenizer or a microfluidizer. The organic solvent is distilled there from so that the polymerizable compound is transferred from the organic solvent phase to the surface of the polymer nanoparticles as it becomes insoluble in the aqueous phase.

Examples of an organic solvent having boiling point of lower than 100° C. include acetone, methyl ethyl ketone, tetrahydrofuran, ethyl ether, n-propyl ether, isopropyl ether, n-butyl methyl ether, tert-butyl methyl ether, n-butyl ethyl ether, tert-butyl ethyl ether, ethyl acetate, isopropyl acetate, methyl propionate and acetonitrile although they are non-limitative. In addition, each of them may be used solely or they may be used jointly by mixing them. Among those ones, ethyl acetate and methyl ethyl ketone are preferred as the organic solvent used for charging the polymerizable compound to the surface of the polymer nanoparticles.

After distilling, other components are added to complete the aqueous radiation curable inkjet ink, such as a colorant or surfactant.

A colour pigment dispersion may be prepared by precipitating or milling the colour pigment in the dispersion medium in the presence of a polymeric dispersant and then adding the pigment dispersion to the inkjet ink, or simply by mixing a self-dispersible colour pigment into the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients will vary widely depending upon the specific materials and the intended applications. The contents of a milling mixture comprise the mill grind and the milling media. The mill grind comprises pigment, dispersant and a liquid carrier such as water. For aqueous ink-jet inks, the pigment is usually present in the mill grind at 1 to 50 wt %, excluding the milling media. The weight ratio of pigment over dispersant is 20:1 to 1:2.

The milling time can vary widely and depends upon the pigment, the selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application.

Inkjet Printing Methods

An inkjet printing method according to a preferred embodiment of the present invention includes the steps of: a) jetting the aqueous radiation curable inkjet ink of the invention onto a substrate; and b) curing the aqueous radiation curable inkjet ink.

There is no real limitation on the type of substrate.

In a preferred embodiment, especially when polymerizable photoinitiators are charged onto the polymer particles, the substrate is selected from the group consisting of food packaging, drink packaging, pharmaceutical packaging, cutlery, drinking vessels, dinner plates, placemates, toys, medical devices, shoes, textile and clothing.

Inkjet Printing Devices

The one or more aqueous inkjet inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal print heads.

The inkjet print head normally scans back and forth in a transversal direction across the moving ink-receiver surface. Often the inkjet print head does not print on the way back. Bi-directional printing is preferred for obtaining a high area throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

EXAMPLES

Materials

All materials used in the following examples were readily available from standard sources such as Aldrich Chemical Co. (Belgium) and Acros (Belgium) unless otherwise specified. The water used is demineralized water.

PP-1 is a 42 wt % acrylated PU dispersion in water of an acrylated polyurethane based latex available as Bayhydrol™ UV XP 2689 from BAYER.

DPGDA is dipropyleneglycoldiacrylate from SARTOMER.

SR351 is Cyclic trimethylolpropane formal acrylate available as Sartomer™ SR531 from SARTOMER.

I500 is 1:1 mixture of 1-Hydroxy-cyclohexyl-phenyl-ketone and Benzophenone available as Irgacure™ 500 from BASF.

I2959 is 1-[4-(2-Hydroxyethoxy)-phenyl]-2-hydroxy-2-methyl-1-propane-1-one available as Irgacure™ 2959 from BASF.

ITX is isopropyl thioxanthone supplied by Rahn.

TPO L is ethyl phenyl(2,4,6-trimethylbenzoyl) phosphinate, supplied by BASF.

EPD is 4-dimethylamino benzoic acid ethyl ester supplied Rahn.

BP is benzophenone, supplied by Acros.

Acrylated I2959 is a polymerizable Norrish Type I photoinitiator (CASRN110430-09-6) having the structure:

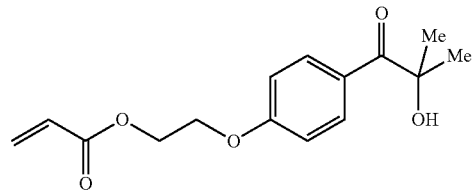 [SMILES: C=CC(=O)OCCOc1ccc(C(=O)C(C)(C)O)cc1]

and was prepared according to example 1 of WO 2009/068590 (AGFA).

Acrylated ITX is a polymerizable thioxanthone derivative (CASRN112771-35-2) having the structure:

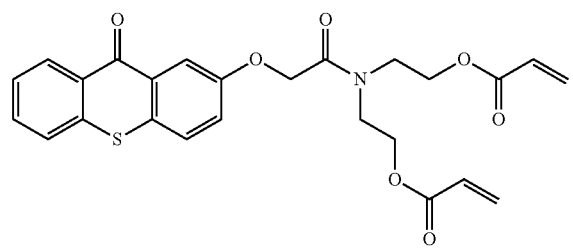 [SMILES: C=CC(=O)OCCN(CCOC(=O)C=C)C(=O)COc1ccc2sc3ccccc3c(=O)c2c1]

and was prepared according to example 2 (INI-C12) of WO 2009/030658 (AGFA).

Acrylated TPO L is a polymerizable acylphosphine oxide derivative (CASRN578738-30-4) having the structure:

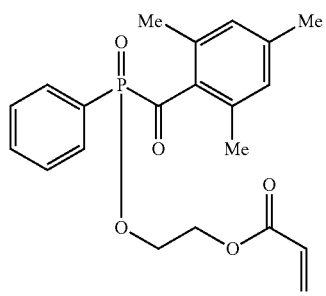 [SMILES: C=CC(=O)OCCOP(=O)(C(=O)c1c(C)cc(C)cc1C)c1ccccc1]

and was prepared according to example 12 of DE 10206096 (BASF).

Acrylated BP is a polymerizable benzophenone derivative (CASRN22421-66-5) which was prepared according to the following scheme:

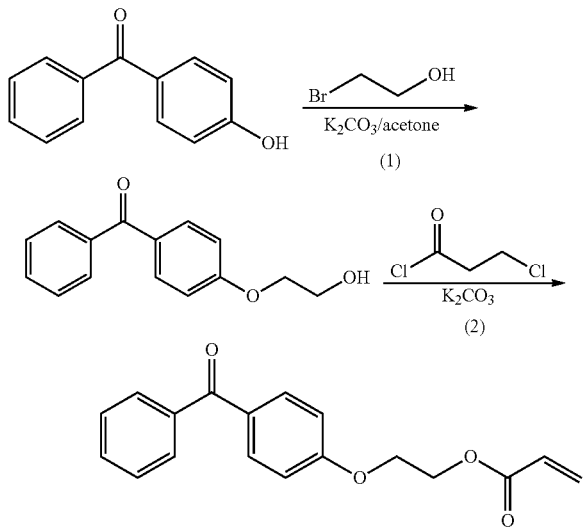

whereby step (1) is decribed in more detail by Lehaf et al., Langmuir, 27(8), 4756-4763 (2011) and step (2) is described in more detail by example 3 (INI-7) of WO 2009/068590 (AGFA).

Acrylated EPD is a polymerizable 4-dimethylamino-benzoic acid derivative (CASRN77016-81-0) having the structure:

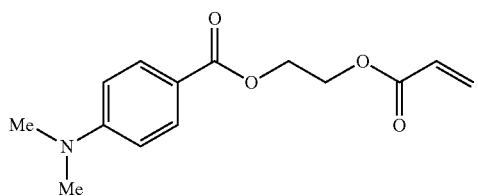 [SMILES: C=CC(=O)OCCOC(=O)c1ccc(N(C)C)cc1]

and was prepared according to example 1 (COINI-1) of WO 2009/030658 (AGFA)

Diamond™ D75C is a 15% dispersion of C.I. Pigment Blue 15:3 in water having a surface tension of 55 mN/m and an average particle size of 100 nm, available from Diamond Dispersions Ltd. (UK).

BYK™ 348 is a polyethermodified polysiloxane from BYK GMBH.

2-pyrrolidone and 1,2-hexane diol were supplied by Acros

PET100 is a 100 μm unsubbed PET substrate with on the backside an antiblocking layer with antistatic properties available from AGFA-GEVAERT as P100C PLAIN/ABAS.

Measurement Method

1. Viscosity

The viscosity of the inkjet ink was measured at 25° C. and at a shear rate of 1,000 $s^{-1}$ using a Rotovisco™ RV1 viscometer from HAAKE.

2. Surface Tension

The static surface tension of the radiation curable inks was measured with a KRÜSS tensiometer K9 from KRÜSS GmbH, Germany at 25° C. after 60 seconds.

3. Migrateables

A sample of 7.608 $cm^2$ of each comparative and inventive example was put into a 50 ml beaker and extracted with 4.5 ml acetonitrile, using ultrasound for 30 minutes. The extract was transferred into a 5 ml volumetric flask. The samples were rinsed twice with a small amount of acetonitrile and the rinsing solvent was transferred into the 5 ml volumetric flask until the volume was adjusted to 5 ml. The solution was thoroughly mixed and filtered over a 0.45 μm filter. 15 μl of each sample was injected on the HPLC.

The Chromatographic Method:

An Alltime C18 5 μm column (150×3.2 mm), supplied by Alltech, was used. A flow rate of 0.5 ml/min was used at a temperature of 40° C. The concentration of each photoinitiator and coinitiator was determined relative to standard solutions at a wavelength specified in Table 2 for each compound.

TABLE 2

| Compound | Detection wavelength (nm) |
|---|---|
| ITX | 254 |
| Acrylated ITX | 254 |
| BP | 254 |
| Acrylated BP | 284 |
| TPO L | 220 |
| Acrylated TPO L | 220 |
| I2959 | 254 |
| Acrylated I2959 | 254 |
| EPD | 312 |
| Acrylated EPD | 312 |
| I500 | 254 |

The gradient used for the determination of the different compounds is shown by Table 3, wherein Eluent A is water and Eluent B represents acetonitrile.

TABLE 3

| Time (min) | % eluent A | % eluent B |
|---|---|---|
| 0 | 55 | 45 |
| 6 | 55 | 45 |
| 11 | 0 | 100 |
| 30 | 0 | 100 |
| 31 | 55 | 45 |
| 38 | 55 | 45 |

Example 1

This example illustrates the improved jettability when the polymer particles are charged with a polymerizable compound.

Preparation of Charged Polymer Particles CPP-1

100 g of PP-1 was diluted with 100 g water. 5.312 g of DPGDA was slowly added to the aqueous dispersion while continuously stirring, using a Disperlux™ stirrer at 800 rpm. After the addition, the mixture was further stirred for 20 minutes at 800 rpm. The charged latex was filtered over a MN1670 filter supplied by Machery-Nagel and used without further treatment as CPP-1 in the formulation of inventive inkjet inks INV-1 and INV-2.

Preparation of Aqueous UV Curable Inkjet Inks

The aqueous radiation curable inkjet inks COMP-1, COMP-2, INV-1 and INV-2 were prepared by mixing the components according to Table 4, wherein the weight percentage (wt %) is based on the total weight of the inkjet ink.

TABLE 4

| wt % of component: | COMP-1 | COMP-2 | INV-1 | INV-2 |
|---|---|---|---|---|
| PP-1 | 11.9 | 17.5 | — | — |
| CPP-1 | — | — | 23.81 | 35.0 |
| I500 | 1.1 | 1.1 | 1.1 | 1.1 |
| Diamond ™ D75C | 20.0 | 20.0 | 20.0 | 20.0 |
| BYK ™ 348 | 0.7 | 0.7 | 0.7 | 0.7 |
| 2-Pyrrolidone | 10.0 | 10.0 | 10.0 | 10.0 |
| 1,2-Hexanediol | 20.0 | 16.0 | 20.0 | 16.0 |
| Water | 50.0 | 54.0 | 50.0 | 19.0 |

After mixing, the prepared inkjet inks were first filtrated over a 1 μm filter and then over a 0.45 μm filter, before being filled into an ink cartridge of a Dimatix DMP2831 inkjet printer. The ink cartridges were allowed to rest for 60 minutes after filling.

Results and Evaluation

A printing test with the four inkjet inks was performed on a Dimatix DMP2831 inkjet printer with a cartridge temperature set to 24° C. at a firing frequency of 5 kHz and a firing voltage of 20V-25V using a standard Dimatix 10pl head without degassing, but with intermediate purging (3 seconds every 20 lines)

TABLE 5

| Inkjet Ink | wt % of polymer particles | Viscosity (mPa · s) | Surface Tension (mN/m) | Jettability |
|---|---|---|---|---|
| COMP-1 | 5 | 11.3 | 28.0 | OK |
| COMP-2 | 7 | 10.5 | 27.4 | cannot be printed |
| INV-1 | 5 | 10.1 | 28.0 | OK |
| INV-2 | 7 | 11.5 | 26.4 | OK |

From Table 5, it should be clear that charging the latex with a monomer allows printing inkjet inks containing 7 wt % or more of polymer particles based on the total weight of the inkjet ink. This is important as physical properties like adhesion and scratch resistance tend to improve when a concentration of polymer particles in the inkjet ink of higher than 5 wt % can be used.

Example 2

This example illustrates advantages of using polymerizable photoinitiators charged on the polymer particles for low migration printing applications.

Preparation of Charged Polymer Particles CPP-2

A solution of 1 g ITX, 1 g TPO L and 1 g EPD in 6 g ethyl acetate was prepared. 50 g of PP-1 was diluted with 50 g water and 7.88 g of the above prepared ethyl acetate solution was slowly added while continuously stirring, using a Disperlux™ stirrer at 800 rpm. After the addition, the mixture was further stirred for 20 minutes at 800 rpm. The ethyl acetate was removed under reduced pressure, using a vacuum of 15 mbar at a temperature of 30° C. An amount of water to correct for the co-evaporated weight of water was added to the mixture and potential residual ethyl acetate was evaporated by using a second treatment under reduced pressure, using a vacuum of 15 mbar at 30° C. Again an amount of water was added to correct for the co-evaporated amount of water. The charged latex was filtered over a MN1670 filter supplied by Machery-Nagel and used as CPP-2 without further treatment in the formulation of comparative inkjet ink COMP-4.

Preparation of Charged Polymer Particles CPP-3

A solution of 1 g 12959, 1 g TPO L, 1 g BP and 1 g EPD in 12 g ethyl acetate was prepared. 50 g of PP-1 was diluted with 50 g water and 10.5 g of the above prepared ethyl acetate solution was slowly added while continuously stirring, using a Disperlux™ stirrer at 800 rpm. After the addition, the mixture was further stirred for 20 minutes at 800 rpm. The ethyl acetate was removed under reduced pressure, using a vacuum of 15 mbar at a temperature of 30° C. An amount of water to correct for the co-evaporated weight of water was added to the mixture and potential residual ethyl acetate was evaporated by using a second treatment under reduced pressure, using a vacuum of 15 mbar at 30° C. Again an amount of water was added to correct for the co-evaporated amount of water. The charged latex was filtered over a MN1670 filter supplied by Machery-Nagel and used without further treatment as CPP-3 in the formulation of comparative inkjet ink COMP-5.

Preparation of Charged Polymer Particles CPP-4

A solution of 2 g acrylated ITX, 2 g acrylated TPO L, and 2 g acrylated EPD in 20 g methylene chloride was prepared. 50 g of PP-1 was diluted with 50 g water and 11.375 g of the above prepared methylene chloride solution was slowly added while continuously stirring, using a Disperlux™ stirrer at 800 rpm. After the addition, the mixture was further stirred for 20 minutes at 800 rpm. The methylene chloride was removed under reduced pressure, using a vacuum of 15 mbar at a temperature of 30° C. An amount of water to correct for the co-evaporated weight of water was added to the mixture and potential residual methylene chloride was evaporated by using a second treatment under reduced pressure, using a vacuum of 15 mbar at 30° C. Again an amount of water was added to correct for the co-evaporated amount of water. The charged latex was filtered over a MN1670 filter supplied by Machery-Nagel and used without further treatment CPP-4 in the formulation of inventive inkjet ink INV-3.

Preparation of Charged Polymer Particles CPP-5

A solution of 1 g acrylated 12959, 1 g acrylated TPO L, 1 g acrylated BP and 1 g acrylated EPD in 10 g ethyl acetate was prepared. 50 g of PP-1 was diluted with 50 g water and 9.19 g of the above prepared ethyl acetate solution was slowly added while continuously stirring, using a Disperlux stirrer at 800 rpm. After the addition, the mixture was further stirred for 20 minutes at 800 rpm. The ethyl acetate was removed under reduced pressure, using a vacuum of 15 mbar at a temperature of 30° C. An amount of water to correct for the co-evaporated weight of water was added to the mixture and potential residual ethyl acetate was evaporated by using a second treatment under reduced pressure, using a vacuum of 15 mbar at 30° C. Again an amount of water was added to correct for the co-evaporated amount of water. The charged latex was filtered over a MN1670 filter supplied by Machery-Nagel and used without further treatment as CPP-5 in the formulation of inventive inkjet ink INV-4.

Preparation of Aqueous UV Curable Inkjet Inks

The aqueous radiation curable inkjet inks COMP-3 to COMP-5, INV-3 and INV-4 were prepared by mixing the components according to Table 6, wherein the weight percentage (wt %) is based on the total weight of the inkjet ink.

TABLE 6

| wt % of component | COMP-3 | COMP-4 | COMP-5 | INV-3 | INV-4 |
|---|---|---|---|---|---|
| PP-1 | 30.95 | 25.31 | 25.91 | 22.95 | 24.15 |
| CPP-2 | — | 11.28 | — | — | — |
| CPP-3 | — | — | 10.08 | — | — |
| CPP-4 | — | — | — | 16.00 | — |
| CPP-5 | — | — | — | — | 13.60 |
| I500 | 0.10 | — | — | — | — |
| SR531 | — | 7.00 | 7.00 | 7.00 | 7.00 |
| BYK ™ 348 | 0.70 | 0.70 | 0.70 | 0.70 | 0.70 |
| Diamond ™ D75C | 20.00 | 20.00 | 20.00 | 20.00 | 20.00 |
| Water | 48.25 | 35.71 | 36.31 | 33.35 | 34.55 |

Results and Evaluation

The above prepared aqueous radiation curable inkjet inks were then coated on a PET100 film using a bar coater and a 10 μm wired bar. The coated samples were dried in an oven at 60° C. for 3 minutes.

All the samples, except COMP-4 and INV-3, were then cured using a Fusion DRSE-120 conveyer, equipped with a Fusion VPS/1600 lamp (H-bulb) by passing the sample twice under the H-bulb lamp at a belt speed of 20 m/min and at full power of the lamp. The samples of COMP-4 and INV-3 were transported four times under a Phoseon™ Fire Line 125 LED curing device with an output wavelength of 395 nm, at a speed of 30 m/min using 4 W output at a distance of 4.5 mm from the LED.

The migrateable amounts of each photoinitiator in the samples were the determined. The results are shown in Table 7. The "Ratio" in Table 7 is the ratio of the amount of the photoinitiator in the inkjet ink over the amount of migrateables found by HPLC. This ratio is indicative on

TABLE 7

| | | Photoinitiator (PI) | | | |
|---|---|---|---|---|---|
| | | | Charged | Quantity in | HPLC results | |
| Inkjet Ink | Type | | on latex | Ink (wt %) | mg/m² | Ratio |
| COMP-3 | I500 | | No | 0.100 | 2.1 | 21.0 |
| COMP-4 | ITX | | Yes | 0.096 | 1.1 | 11.4 |
| | TPO L | | Yes | 0.096 | 0.43 | 4.50 |
| | EPD | | Yes | 0.096 | 0.81 | 8.4 |
| COMP-5 | I2959 | | Yes | 0.065 | 1.51 | 23.4 |
| | TPO L | | Yes | 0.065 | 11.88 | 184.2 |
| | BP | | Yes | 0.065 | 0.74 | 11.5 |
| | EPD | | Yes | 0.065 | 1.46 | 22.6 |
| INV-3 | acrylated ITX | | Yes | 0.137 | — | — |
| | acrylated TPO L | | Yes | 0.137 | — | — |
| | acrylated EPD | | Yes | 0.137 | 0.27 | 2.0 |
| INV-4 | acrylated I2959 | | Yes | 0.087 | — | — |
| | acrylated TPO L | | Yes | 0.087 | — | — |
| | acrylated BP | | Yes | 0.087 | 0.17 | 2.0 |
| | acrylated EPD | | Yes | 0.087 | 0.35 | 4.0 |

From Table 7, it can be observed that low amounts of migrateables are obtained when acrylated photoinitiators are charged onto the polymer particles. Water soluble photoinitiators (COMP-3) or non-acrylated photoinitiators charged on the polymer particles (COMP-4 and COMP-5) deliver substantially higher amounts of migrateables.

The invention claimed is:

1. An aqueous radiation curable inkjet ink comprising:
    an aqueous medium;
    polymer nanoparticles; and
    a polymerizable compound; wherein
    the polymerizable compound is charged onto a surface of the polymer nanoparticles; and
    the polymerizable compound includes a polymerizable photoinitiator; wherein
    the polymerizable compound is charged onto the surface of the polymer nanoparticles by:
        dissolving the polymerizable compound in an organic solvent;
        adding a mixture of the polymerizable compound and the organic solvent to the aqueous medium including the polymer nanoparticles; and
        distilling the organic solvent from the mixture so that the polymerizable compound is transferred from an organic solvent phase to the surface of the polymer nanoparticles.

2. The aqueous radiation curable inkjet ink according to claim 1, wherein the polymer nanoparticles are based on polyurethane or copolymers thereof.

3. The aqueous radiation curable inkjet ink according to claim 1, wherein the polymerizable compound includes at least one ethylenically unsaturated group selected from the group consisting of an acrylate group, a methacrylate group, a vinylether group, a styrene group, an acrylamide group, a methacrylamide group, an allyl ester group, an allyl ether group, a vinyl ester group, a fumarate group, a maleate group, a maleimide group, and a vinyl nitrile group.

4. The aqueous radiation curable inkjet ink according to claim 1, wherein the polymer nanoparticles include at least one ethylenically unsaturated group selected from the group consisting of an acrylate group, a methacrylate group, a vinylether group, a styrene group, an acrylamide group, a methacrylamide group, an allyl ester group, an allyl ether group, a vinyl ester group, a fumarate group, a maleate group, a maleimide group, and a vinyl nitrile group.

5. The aqueous radiation curable inkjet ink according to claim 1, further comprising at least one colorant.

6. The aqueous radiation curable inkjet ink according to claim 5, wherein the at least one colorant is a self-dispersible color pigment.

7. The aqueous radiation curable inkjet ink according to claim 1, wherein the polymer nanoparticles are based on polyurethane or copolymers thereof and include at least one acrylate group; and
    the polymerizable compound includes at least one acrylate group.

8. The aqueous radiation curable inkjet ink according to claim 1, wherein the polymer nanoparticles are self-dispersible polymer nanoparticles.

9. The aqueous radiation curable inkjet ink according to claim 1, wherein the polymer nanoparticles are present in an amount of at least 7 wt % based on a total weight of the aqueous radiation curable inkjet ink.

10. The aqueous radiation curable inkjet ink according to claim 1, further comprising at least one water-soluble triacrylate.

11. An inkjet printing method comprising:
    jetting the aqueous radiation curable inkjet ink according to claim 1 onto a substrate; and
    curing the aqueous radiation curable inkjet ink.

12. The inkjet printing method according to claim 11, wherein the substrate is selected from the group consisting of food packaging, drink packaging, pharmaceutical packaging, cutlery, drinking vessels, dinner plates, placemats, toys, medical devices, shoes, textiles, and clothing.

13. A manufacturing method of an aqueous radiation curable inkjet ink, the method comprising:
charging a polymerizable compound including a polymerizable photoinitiator onto polymer nanoparticles in an aqueous medium; and
adding at least one component selected from the group consisting of a colorant, a surfactant, a pH adjuster, and an organic solvent; wherein
the polymerizable compound is charged onto the surface of the polymer nanoparticles by:
dissolving the polymerizable compound in an organic solvent;
adding a mixture of the polymerizable compound and the organic solvent to the aqueous medium including the polymer nanoparticles; and
distilling the organic solvent from the mixture so that the polymerizable compound is transferred from an organic solvent phase to the surface of the polymer nanoparticles.

14. An aqueous radiation curable inkjet ink comprising:
an aqueous medium;
polymer nanoparticles;
a polymerizable compound; and
a photoinitiator; wherein
the polymerizable compound is charged onto a surface of the polymer nanoparticles;
the polymer nanoparticles are present in an amount of at least 7 wt % based on a total weight of the aqueous radiation curable inkjet ink; and
the polymerizable compound is charged onto the surface of the polymer nanoparticles by:
dissolving the polymerizable compound in an organic solvent;
adding a mixture of the polymerizable compound and the organic solvent to the aqueous medium including the polymer nanoparticles; and
distilling the organic solvent from the mixture so that the polymerizable compound is transferred from an organic solvent phase to the surface of the polymer nanoparticles.

15. The aqueous radiation curable inkjet ink according to claim 14, wherein the polymerizable compound is selected from the group consisting of a monomer, an oligomer, a polymerizable photoinitiator, and a polymerizable co-initiator.

16. The aqueous radiation curable inkjet ink according to claim 14, wherein the polymer nanoparticles are based on polyurethane or copolymers thereof.

17. The aqueous radiation curable inkjet ink according to claim 14, wherein the polymerizable compound includes at least one ethylenically unsaturated group selected from the group consisting of an acrylate group, a methacrylate group, a vinylether group, a styrene group, an acrylamide group, a methacrylamide group, an allyl ester group, an allyl ether group, a vinyl ester group, a fumarate group, a maleate group, a maleimide group, and a vinyl nitrile group.

18. The aqueous radiation curable inkjet ink according to claim 14, further comprising at least one colorant.

19. The aqueous radiation curable inkjet ink according to claim 18, wherein the at least one colorant is a self-dispersible color pigment.

20. The aqueous radiation curable inkjet ink according to claim 14, wherein the polymer nanoparticles are based on polyurethane or copolymers thereof and include at least one acrylate group; and
the polymerizable compound includes at least one acrylate group.

21. The aqueous radiation curable inkjet ink according to claim 14, wherein the polymer nanoparticles are self-dispersible polymer nanoparticles.

22. The aqueous radiation curable inkjet ink according to claim 14, wherein the polymer nanoparticles are present in an amount of 9 to 13 wt % based on the total weight of the aqueous radiation curable inkjet ink.

23. An inkjet printing method comprising:
jetting the aqueous radiation curable inkjet ink according to claim 14 onto a substrate; and
curing the aqueous radiation curable inkjet ink.

24. A manufacturing method of an aqueous radiation curable inkjet ink, the method comprising:
charging a polymerizable compound onto polymer nanoparticles in an aqueous medium; and
adding at least one component selected from the group consisting of a colorant, a surfactant, a pH adjuster, and an organic solvent; wherein
the polymer nanoparticles are present in an amount of at least 7 wt % based on a total weight of the aqueous radiation curable inkjet ink; and
the polymerizable compound is charged onto the surface of the polymer nanoparticles by:
dissolving the polymerizable compound in an organic solvent;
adding a mixture of the polymerizable compound and the organic solvent to the aqueous medium including the polymer nanoparticles; and
distilling the organic solvent from the mixture so that the polymerizable compound is transferred from an organic solvent phase to the surface of the polymer nanoparticles.

25. The manufacturing method of claim 24, wherein the aqueous radiation curable inkjet ink includes a photoinitiator.

* * * * *